United States Patent [19]

Marsh

[11] 3,731,288

[45] May 1, 1973

[54] CIRCULAR MAGNETIC DOMAIN DEVICES

[75] Inventor: Anthony Marsh, Blisworth, England

[73] Assignee: Plessey Handel Und Investments A.G., Zug, Switzerland

[22] Filed: July 28, 1971

[21] Appl. No.: 166,751

[30] Foreign Application Priority Data

Aug. 19, 1970 Great Britain....................39,838/70

[52] U.S. Cl. .......................340/174 TF, 340/174 SR

[51] Int. Cl..........................G11c 11/14, G11c 19/00

[58] Field of Search .................................340/174 TF

[56] References Cited

UNITED STATES PATENTS 3,633,185 1/1972 Danylchuk.....................340/174 TF

OTHER PUBLICATIONS

Levi, R., Bubble Splitter, IBM Technical Disclosure Bulletin, Vol. 13, No. 9, Feb. 1971, pg. 2711.

Almas, G. S. et al., Bubble Domain Logical Inverter, IBM Technical Dislcosure Bulletin, Vol. 13, No. 6, Nov. 1970, pg. 1581-1582.

*Primary Examiner*—Stanley M. Urynowicz, Jr.
*Attorney*—Alex Friedman et al.

[57] ABSTRACT

A circular magnetic domain device wherein binary information in the form of propagating circular magnetic domains is converted into information in the form of electrical impulses by causing each of the propagating magnetic domains to be expanded in a direction transverse to its direction of propagation in order to effect an abrupt division of the domain into at least two separate parts which collapse very rapidly after division into two circular magnetic domains. Means are provided for detecting the division of each of the magnetic domains and generating an electrical impulse whose magnitude is proportional to the velocity of the division.

6 Claims, 4 Drawing Figures

CIRCULAR MAGNETIC DOMAIN DEVICES

Figure 1:
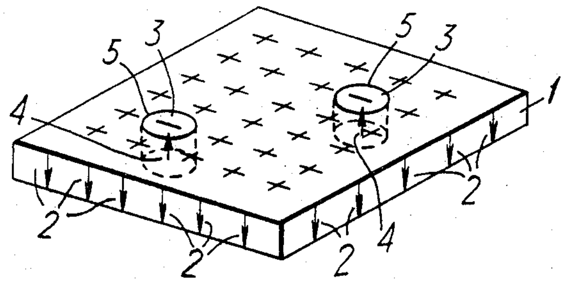

The invention relates to circular magnetic domain devices and in particular to a read-out arrangement for these devices.

Known circular magnetic domain devices include a thin layer of uniaxial magnetic material, for example, orthoferrite, which possesses an easy axis for a magnetic vector that is directed normal to the thin magnetic layer. It is possible for the thin magnetic layer to possess a positive magnetic vector at all points except for a few small circular regions, called magnetic domains or magnetic bubbles, within which the magnetic vector is negative. It should be noted that the polarities positive and negative are only arbitrarily assigned. The cylindrical internal surface forming the boundary between each of the magnetic domains and the remainder of the magnetic material of the thin layer are termed domain walls or, more explicitly, 180° Bloch walls. The magnetic domains or bubbles are nucleated and made to propagate within the thin magnetic layer in a manner which is described by A. H. Bobeck et al. in the I.E.E.E. Transactions on Magnetics, Volume MAG. 5, No. 3, September, 1969 at pages 544 to 565.

Magnetic shift registers and magnetic serial information stores can be based on circular magnetic domains since these domains have the important properties that they are permanent and maintain a consistent size and that they possess high lateral mobility across the thin layer of magnetic material, and they can, therefore, move at high speeds when subjected to a magnetic field gradient. If the binary value "1" is assigned to the presence of a circular magnetic domain at a certain position and time, and the binary value "0" is assigned to the absence of a circular magnetic domain at that certain position and time; then the flow of binary information across the thin magnetic layer will correspond to the linear flow of a binary pattern of circular magnetic domains across the layer. The binary information can be processed in a variety of magnetic ways and ultimately the binary information is converted by a read-out arrangement into electrical impulses which are utilized for a variety of purposes, for example, for the transmitting of the binary information over distances too great to be spanned by the thin magnetic layer. The read-out arrangements of known circular magnetic domain devices can utilize a conductor loop which is placed in close proximity to the thin magnetic layer in the path of the linear flow of magnetic domains, and the propagating magnetic domains induce a relatively small voltage across the conductor loop, the value of the voltage being determined by the velocity of the magnetic domains.

The invention provides a circular magnetic domain device which includes a layer of uniaxial magnetic material; first generating means for generating within the magnetic layer circular magnetic domains in the form of a binary pattern of information, each bit of the binary pattern being represented by either the presence or absence of a domain; propagating means for causing the generated binary pattern of domains to propagate along the magnetic layer; and a read-out arrangement for translating the binary pattern into electrical impulses, the read-out arrangement including first means for expanding a circular magnetic domain in a direction transverse to its direction of propagation in order to effect an abrupt division of the domain into at least two separate parts, each of the divided parts forming a further circular magnetic domain and second means for detecting the division of the domain and generating an electrical impulse whose magnitude is proportional to the velocity of the said division.

Figure 2:
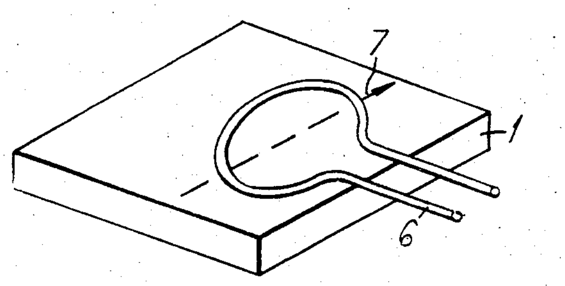
Figure 3:
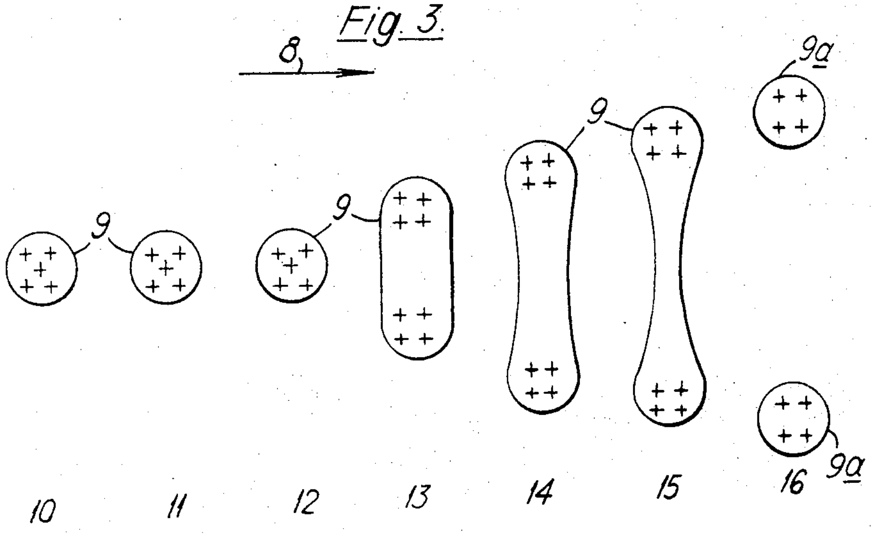
Figure 4:
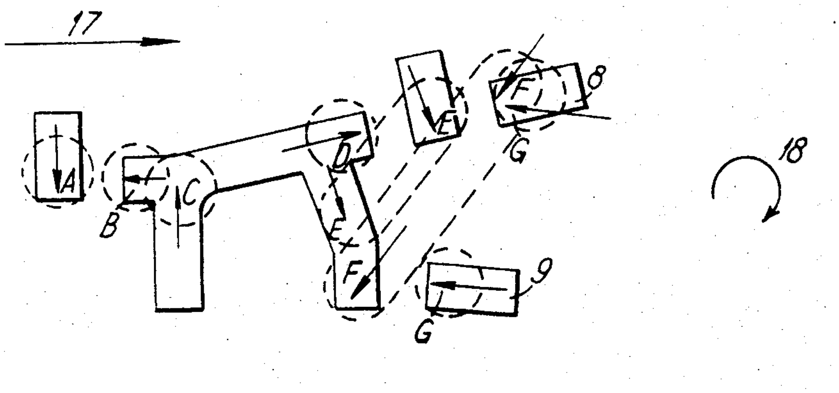

The foregoing and other features according to the invention will be better understood from the following description with reference to the accompanying drawings, in which:

FIG. 1 diagrammatically illustrates the basic principles of a circular magnetic domain device, FIG. 2 diagrammatically illustrates the read-out arrangement of a known circular magnetic domain device, FIG. 3 illustrates the basic operating principles of the read-out arrangement which forms part of the circular magnetic domain device according to the present invention and FIG. 4 diagrammatically illustrates one arrangement for a permeable circuit for effecting the operating principles illustrated in the drawing according to FIG. 3.

Referring to FIG. 1 of the drawings, which illustrates the basic principles of a circular magnetic domain device, a thin layer 1 of uniaxial magnetic material, for example orthoferrite, is illustrated, which possesses an easy axis for a magnetic vector directed normal to the layer. It is possible, as previously stated, for the magnetic layer 1 to possess a positive magnetic vector 2 at all points except for a few small circular regions 3, called magnetic domains, within which the magnetic vector 4 is negative. The cylindrical internal surface 5 forming the boundary between the domains 3 and the remainder of the material of the layer 1 forms a domain wall, or, more explicitly, a 180° Bloch wall. As previously stated, the polarities positive and negative are arbitrarily assigned and should, therefore, not be considered as a limitation.

The magnetic domains can, as is described in detail in the previously cited I.E.E.E. Transactions, be caused to propagate along the magnetic layer 1 of FIG. 1 by the use of a permeable circuit that is constituted by a pattern of soft magnetic material, for example, isotropic Permalloy, which is formed on a major surface of the magnetic layer 1 and which defines a propagation path for the magnetic domains. This pattern is called a T-BAR overlay pattern because of the arrangement of the magnetic bars which form the pattern. The manner in which propagation is effected is described in the cited I.E.E.E. Transactions, and it will, therefore, not be described in any detail in this specification. It should, however, be noted that the circular magnetic domain device according to the present invention is not limited to the use of a T-BAR overlay to effect propagation, this pattern configuration is given by way of example only and other pattern configurations and propagation methods are possible which, will be evident and/or known to a person skilled in this particular art.

In general, the principle of propagation by means of a travelling wave in a permeable circuit can be regarded as being based on the attraction of the individual magnetic domains to a magnetic pole concentrated (of a certain sign) in the permeable circuit. The pole concentrations can, in response to a variation of an applied magnetic field, for example an applied rotating field, be made to either move smoothly or re-appear at discreet intervals along a propagation path of the permeable circuit.

The generation of the magnetic domains can, as is described in detail in the previously cited I.E.E.E. Transactions, be effected either by the use of conducting loops or by the use of a pattern of soft magnetic material, for example, isotropic Permalloy, which is formed on a major surface of the layer 1, at that position, i.e. adjacent to the start of the propagation path defined by, for example, the T-BAR overlay, where magnetic domain generation is to be effected. The latter magnetic domain generation method utilizes, at the generation position, a disc of the soft magnetic material that is formed on the layer 1 and has a permanent magnetic domain associated with it which stays in contact with a positive pole formed on the disc by a rotating transverse magnetic field. As the magnetic field associated with the disc rotates, the discs' magnetic domain also rotates and at some point during rotation attaches itself to the propagation paths magnetic pattern. As the magnetic field continues rotation after the magnetic domain has become attached to the propagating paths magnetic pattern, the magnetic domain is stretched until it ruptures into two portions. One of the portions remains on the disc and can be used to generate further domains whilst the other portion remains in the propagation path. Both portions then return to a magnetic domain size which is determined by the bias field.

In order to convert the binary information which is in the form of the circular domains, into information in the form of electrical impulses, the known circular domain devices can, as illustrated in FIG. 2 of the drawings, utilize a conductor loop 6 which is placed near to the magnetic layer 1. The basic principle of operation of this read-out arrangement is exactly that of electromagnetic induction. If the path of the linear flow of circular magnetic domains or domain train is as denoted in FIG. 2 by the arrow 7 and if the diameter of the loop 6 is equal to, or marginally larger than, the diameter of a circular magnetic domain, then the voltage pulses induced across the conductor loop are, at best, of the order of 10 to 100 microvolts; the actual value being limited by the limiting velocity of the circular domain.

In order to obtain, momentarily, very high velocities, and thereby higher induced voltages in a conductor loop, the read-out arrangement for the circular magnetic domain devices according to the present invention causes each of the circular magnetic domains of the propagating magnetic domain train to be expanded in a direction transverse to the direction of propagation of the magnetic domains. This expansion is effected by means of a magnetic influence which causes each of the magnetic domains to be formed into an elongated section that divides abruptly at some critical elongation; the two halves of the divided magnetic domain then contract at a very high velocity to form a pair of circular magnetic domains.

The design concept of the read-out arrangement for the circular magnetic domain device according to the invention is that a magnetic pole concentration in the permeable circuit that is attracting an individual circular magnetic domain must divide into two separate concentrations which gradually move apart, and so expand the circular magnetic domain into an elongated form which eventually splits into two parts which then collapse very rapidly into two circular magnetic domains.

FIG. 3 of the drawings illustrates, in stages, i.e. stages 10 to 16, the desired path of the magnetic pole concentrations for expansion of a magnetic domain 9 in a direction transverse to its propagation direction which is indicated in the drawing by the arrow 8.

The magnetic pole concentration (indicated by the +ve signs) of the permeable circuit attracting the magnetic domain 9 is centered on the domain 9 at stages 10 to 12 but at stages 13 to 15 the magnetic pole concentration divides into two separate concentrations which are arranged such that they are progressively further apart at each subsequent stage. This separation of the magnetic pole concentration causes expansion of the magnetic domain 9 which at some critical elongation parts abruptly to form at stage 16 a pair of circular domains **9*a***. Obviously, any pair of diverging paths in the permeable circuit which could be straight or curved paths, would be equally suitable in practice to effect the elongation and abrupt separation of a magnetic domain.

An example of a suitable shape for a permeable circuit to effect the elongation and abrupt separation of a magnetic domain is illustrated in FIG. 4 of the drawings. This permeable circuit would be a continuation of the permeable circuits that effect the generation and propagation of the circular magnetic domains and the direction of propagation of the magnetic domain train is indicated in FIG. 4 by the arrow 17.

The heads of the arrows illustrated in FIG. 4 of the drawings which are labelled in the sequence A to G, corresponding to the positions of magnetic pole concentrations in response to an applied rotating magnetic field, the direction of rotation being indicated by the arrow 18. The instantaneous orientation of the rotating magnetic field is indicated by the direction of the arrows A to G. Thus, pole concentrations diverge on limbs 8 and 9 and the consequent propagation and expansion of a circular domain (illustrated in dotted detail in FIG. 4) is illustrated in FIG. 4 by the shape of the domain at each of the stages.

The circular magnetic domain is applied or fed, to the permeable circuit of FIG. 4 at stage A from where it propagates through the stages B, C and D to stage E. As illustrated in FIG. 4, the circular magnetic domain is first expanded at stage E and continues to expand still further as it propagates to stage F. The critical elongation is achieved during propagation between stages F and G, and, therefore, the transversely expanded magnetic domain divides abruptly into two parts at this point to form the two circular magnetic domains that are illustrated at stage G i.e. at the limbs 8 and 9.

An electro-magnetic read-out loop (not illustrated in FIG. 4) i.e. the loop 6 illustrated in FIG. 2 of the drawings is placed near to the permeable circuit of FIG. 4 such that it encompasses the stages F and G. This read-out loop will, therefore, sense the most rapid rate of change of flux i.e. due to the division of the expanded magnetic domain, and thereby result in an output voltage impulse which is of a magnitude higher than the magnitude of the output voltage impulses obtained from known circular magnetic domain devices.

The shape of the permeable circuit of FIG. 4 naturally requires optimizing to give a smooth propagation of the circular magnetic domains, and an advantageous, but not necessarily an essential feature of the design of the permeable circuit is to achieve magnetic domain splitting in a region of the layer of magnetic material on which the permeable circuit is formed which is not covered by any electrically conducting permeable circuitry. This will enable the domain collapse to be effected without damping effects due to eddy currents induced in the electrically conducting parts and also to facilitate the placing of the read-out loop in close proximity to the layer of magnetic material at the desired position.

Another general approach to a read-out arrangement for a circular magnetic domain device would be to use the electrically conducting permeable circuit of FIG. 4 in association with a second permeable circuit for example the T-BAR overlay pattern previously referred to, within which circular magnetic domains can be caused to propagate such that they propagate past and in close proximity to stage E of the circuit of FIG. 4. The simultaneous appearance of circular magnetic domains at stage E and at the adjacent part of the second permeable circuit will, by means of mutual repulsion between the two domains, prevent the circular magnetic domain propagating in the circuit of FIG. 4 from reaching stages F and G. Thus, no output signal will be generated in the conductor loop associated with the permeable circuit of FIG. 4 and the circular magnetic domain will be caused to propagate through to the limb 8 only of stage G, no circular magnetic domain will appear at the limb 9.

With this arrangement, the binary pattern of circular magnetic domains containing the information to be read-out can be caused to propagate in the second permeable circuit, and the permeable circuit of FIG. 4 can be arranged such that a circular magnetic domain is caused to be present at stage E in synchronism with the appearance of each bit of the information to be read-out at the adjacent part of the second permeable circuit. Thus, no output signal from the conductor loop associated with the permeable circuit of FIG. 4 would correspond to the presence of a circular domain in the second permeable circuit, and vice-versa. It can, therefore, be seen that the pattern of output signals produced by this arrangement is the reverse of the pattern of output signals that would be produced for the same binary pattern of circular magnetic domains propagating in a permeable circuit connected in series with the permeable circuit of FIG. 4. With the latter arrangement an output pulse is generated for each magnetic domain in the binary pattern whereas in the other arrangement it is the absence of a magnetic domain in the binary pattern that causes an output pulse to be generated, and this reversal of the binary information pattern can be used to advantage in many applications.

Also, the binary pattern of circular magnetic domains appearing at the limb 9 of the permeable circuit of FIG. 4 will, with this arrangement, be the direct opposite of the binary pattern of circular magnetic domains propagating in the second permeable circuit i.e. the presence of a circular magnetic domain in the binary pattern propagating in the second permeable circuit will result in the absence of a circular magnetic domain at the limb 9, and vice-versa. This binary pattern of circular magnetic domains can also be used to advantage in many applications, the utilization circuit being connectable to the limb 9 either directly or via another permeable circuit.

The read-out arrangement of known circular magnetic domain devices may also be based upon an integrated circuit device that is capable of detecting magnetic fields, for example by the Hall Effect. The integrated circuit device would be placed against the magnetic layer at the required position and would offer sensitivities higher than those obtained from a conductor loop and simple uniform motion of the circular magnetic domains. Such a device, however, is very expensive to produce compared with the read-out arrangement of the circular magnetic domain device according to the present invention.

It is to be understood that the foregoing description of specific examples of this invention is made by way of example only and is not to be considered as a limitation in its scope.

What is claimed is:

1. A circular magnetic domain device which includes a layer of uniaxial magnetic material; first generating means for generating within the magnetic layer circular magnetic domains in the form of a binary pattern of information, each bit of the binary pattern being represented by either the presence or absence of a domain; propagating means for causing the generated binary pattern of domains to propagate along the magnetic layer; and a read-out arrangement for translating the binary pattern into electrical impulses, the read-out arrangement including first means for expanding a circular magnetic domain in a direction transverse to its direction of propagation in order to effect an abrupt division of the domain into at least two separate parts, each of the divided parts forming a further circular magnetic domain, and second means for detecting the division of the domain and generating an electrical impulse whose magnitude is proportional to the velocity of the said division.

2. A circular magnetic domain device as claimed in claim 1 wherein the first means of the read-out arrangement are in series with the propagation means and effect division of each of the propagating domains of the binary pattern, the electrical impulses generated by the second means being in the form of a binary pattern identical to the binary pattern of circular magnetic domains.

3. A circular magnetic domain device as claimed in claim 1 wherein the read-out arrangement includes second generating means for generating circular magnetic domains within the magnetic layer and causing the generated domains to propagate through the first means, wherein the binary pattern of circular magnetic domains is caused to propagate past and in close proximity to the first means in a manner such that the appearance of each bit of the binary pattern at the first means is synchronized with the appearance thereat of a circular magnetic domain generated by the second generating means, wherein each bit of the binary pattern which is represented by a circular magnetic domain inhibits the division of the corresponding domain by the first means, and thereby prevents the generation of an electrical impulse, and wherein each bit of the binary pattern which is represented by the absence of a circular magnetic domain allows division of the corresponding domain to be effected and an electrical impulse to be generated.

4. A circular magnetic domain device as claimed in claim 3 including means for detecting and utilizing that one of the further domains of each division which provide a domain train having a binary pattern which is the reverse of the binary pattern of the domains generated by the first generating means.

5. A circular magnetic domain device as claimed in claim 1 wherein the first means of the read-out arrangement includes a magnetically permeable circuit formed on a surface of the magnetic layer, the circuit defining a propagation path for the circular magnetic domains which divides into two paths; and means for generating magnetic pole concentrations at successive positions along the propagation paths to facilitate the propagation, transverse expansion, and thereby the division of each of the circular magnetic domains.

6. A circular magnetic domain device as claimed in claim 1 wherein the second means of the read-out arrangement includes a conductor loop located in close proximity to, and encompassing that section of a surface of the magnetic layer whereat circular magnetic domain division is effected.

* * * * *